(12) United States Patent
Gurbuz et al.

(10) Patent No.: US 8,462,812 B2
(45) Date of Patent: Jun. 11, 2013

(54) METHOD FOR ESTIMATION OF RESIDUAL BANDWIDTH

(75) Inventors: Ozgur Gurbuz, Istanbul (TR); Ozgur Ercetin, Istanbul (TR); Yunus Sarikaya, Istanbul (TR); Cem Atalay, Istanbul (TR)

(73) Assignee: Sabanci Universitesi, Istanbul (TR)

( * ) Notice: Subject to any disclaimer, the term of this patent is extended or adjusted under 35 U.S.C. 154(b) by 206 days.

(21) Appl. No.: 13/131,024

(22) PCT Filed: Nov. 25, 2008

(86) PCT No.: PCT/IB2008/054933
§ 371 (c)(1),
(2), (4) Date: May 24, 2011

(87) PCT Pub. No.: WO2010/061241
PCT Pub. Date: Jun. 3, 2010

(65) Prior Publication Data
US 2011/0228695 A1 Sep. 22, 2011

(51) Int. Cl.
*H04J 3/16* (2006.01)
*H04J 3/22* (2006.01)

(52) U.S. Cl.
USPC .......... 370/468; 370/477; 370/240; 370/241; 370/245

(58) Field of Classification Search
USPC ................ 370/468, 477, 242, 241, 235
See application file for complete search history.

(56) References Cited

U.S. PATENT DOCUMENTS

| | | | | |
|---|---|---|---|---|
| 7,127,519 | B2 * | 10/2006 | Li | 709/230 |
| 7,206,319 | B2 * | 4/2007 | Li et al. | 370/448 |
| 7,664,031 | B2 * | 2/2010 | Davis | 370/235 |
| 8,085,131 | B2 * | 12/2011 | Park et al. | 340/10.2 |
| 8,160,090 | B2 * | 4/2012 | Yoshizawa et al. | 370/450 |
| 8,208,487 | B2 * | 6/2012 | Zhang et al. | 370/464 |
| 8,238,235 | B2 * | 8/2012 | Elaoud et al. | 370/230 |
| 2004/0004938 | A1 * | 1/2004 | Buddhikot et al. | 370/238 |
| 2006/0176829 | A1 * | 8/2006 | McLaughlin et al. | 370/252 |
| 2009/0238163 | A1 * | 9/2009 | Zhang et al. | 370/338 |

OTHER PUBLICATIONS

International Search Report, mailing date Aug. 14, 2009, for corresponding International Application No. PCT/IB2008/054933.

* cited by examiner

*Primary Examiner* — Huy D Vu
*Assistant Examiner* — Omer Mian
(74) *Attorney, Agent, or Firm* — Intellectual Property Law Group LLP

(57) ABSTRACT

This invention related to a bandwidth estimation method which is easily implementable on network nodes and enables to be made better routing decisions (for example the link with higher residual bandwidth should be favored in routing decisions) and/or estimates the flow admission control (for example accept a new flow only if there is enough available path residual bandwidth) by enabling estimation of availability of the communication capacity estimates.

6 Claims, 1 Drawing Sheet

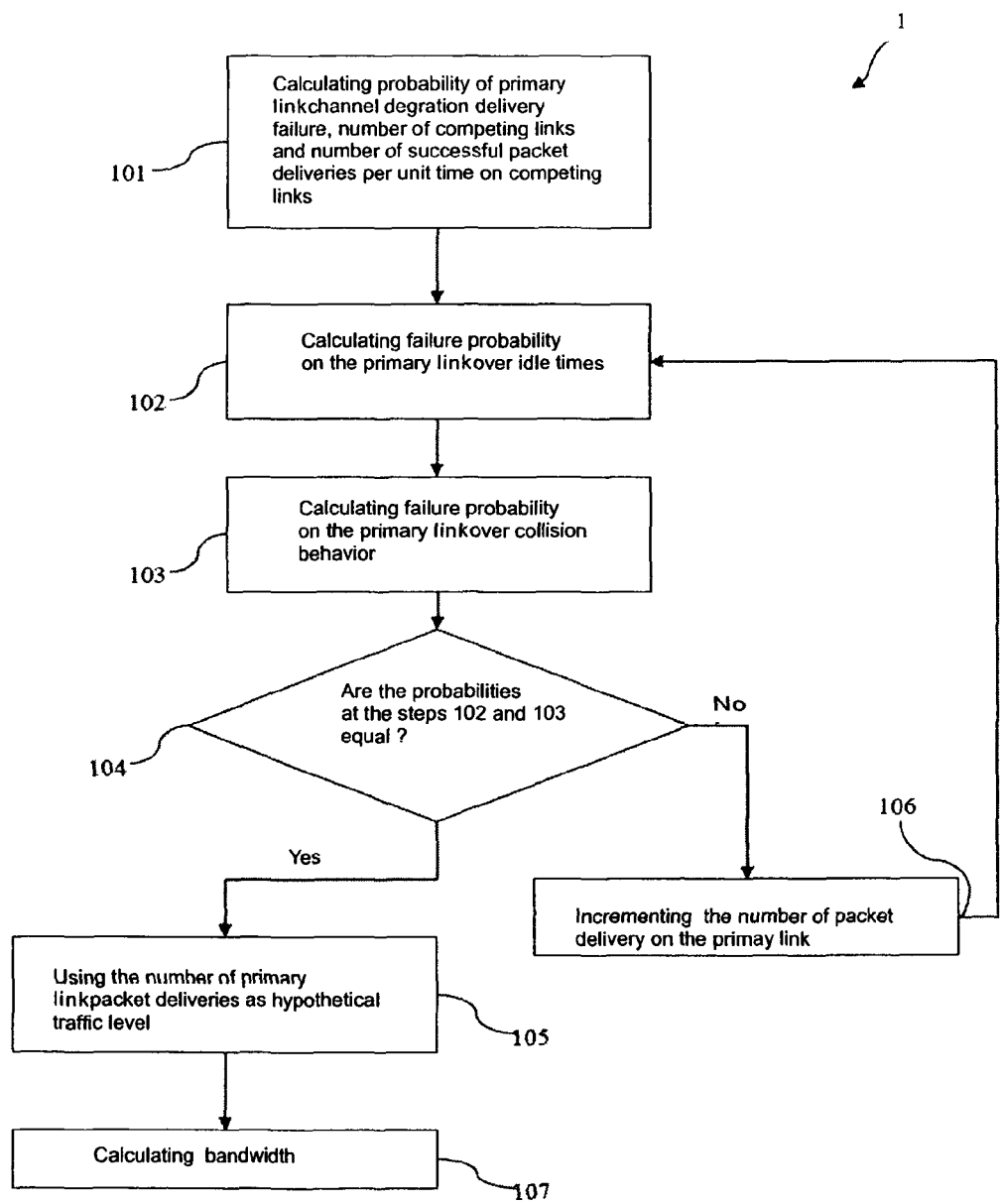

METHOD FOR ESTIMATION OF RESIDUAL BANDWIDTH

CROSS-REFERENCE TO RELATED APPLICATIONS

This application is a U.S. National Phase application, under 35 U.S.C. §371, of International Application no. PCT/IB2008/054933, with an international filing date of Nov. 25, 2008, which is hereby incorporated by reference for all purposes.

TECHNICAL FIELD

This invention relates to a method for estimation of a residual bandwidth to calculate the residual bandwidth in the wireless mesh networks.

PRIOR ART

A wireless mesh network (WMN) is a communications network made up of radio nodes in which there are at least two pathways of communication to each node. Wireless mesh network infrastructure consists of access point/mesh router nodes interconnected by wireless links. A wireless mess network is connected to other wireline networks such as internet or corporate LAN via a mesh gateway node. Wireless mesh architecture is the first significant step towards providing high-bandwidth wireless network over a specific coverage area as it is built of peer radio devices that do not have to be cabled to a wired port as in the case of the traditional wireless local area networks.

A key step in the provision of better service quality via WMN deployment is to estimate the trallic handling capacities of the wireless network links/paths. The difference between the network link/path capacity and the current throughput of the system identifies the additional user demand that can still be satisfied under current conditions. This difference is known as residual bandwidth and was previously discussed in the art within the framework of ad hoc wireless networks.

One of the major issues impeding the development and wide-scale deployment of WMNs is the lack of an accurate traffic handling capability estimation method easily implementable on network nodes. WMNs use 802.11 based wireless links that are contending with each other for shared radio resource and communication on these links are prone to dynamically changing effects such as external interferences, collisions and radio channel degradations. Under these conditions, it is much harder to predict how much traffic a wireless link could handle on top of its existing load compared to wireline case. Thus accurate estimation of available traffic handling capacity (that is formally named as residual bandwidth in the art) for wireless links become very important for effective routing and resource management in WMNs.

Primary access method of IEEE 802.11 is by means of Distributed Coordination Function (DCF) which is based on CSMA/CA. There are two fundamental approaches to residual bandwidth estimation problem in wireless networks: 1) active (or intrusive); and 2) passive (or non-intrusive) methods. In active methods, probe packets are sent to explore link characteristics or to saturate the wireless links and then estimate the residual bandwidth based on delay variation occurring at the saturation point. Another technique is to insert "hello" packets to neighboring node traffic. These packets carry local available bandwidth information to other nodes, so that the contention levels can be deduced which is then used in residual bandwidth estimation. A major drawback of active methods is their significant overhead due to extraneous control packets.

Passive approaches to residual bandwidth estimation are non-intrusive, as no additional probe packets are inserted into the system. One popular method in the art is called the "listen" method and it is based on listening channel activity to deduce channel idleness ratio. This ratio is adjusted via a smoothing constant or a weight factor against the back-off and collision related overestimation. This adjusted idleness ratio is then multiplied with physical data-rate to obtain the residual bandwidth. However, due to 802.11 wireless network characteristics, an empirically assigned weight factor causes significant inaccuracies in estimation process. Another passive technique, called "time measurement" method, is based on measuring the time spent for successful completion of a DATA packet delivery. This measured delay is then normalized according to packet size and its reciprocal value is taken as residual bandwidth. However, this technique does not model the change in system dynamics as saturation is approached. Therefore, it is unable to take into account the capacity reducing effects of inter-link and inter-flow competition.

BRIEF DESCRIPTION OF INVENTION

The objective of this invention is to develop a method for the estimation of residual bandwidth which is easily implementable on network nodes and which is able to correctly estimatethe accurate traffic handling capability.

DETAILED DESCRIPTION OF INVENTION

A method for estimation of the residual bandwidth implemented to achieve the objective of this invention is illustrated in the accompanying drawing, in which:

FIG. 1 is a flow diagram of the method for estimation of residual bandwidth.

In the method for estimation of residual bandwidth that is the subject of the invention, networks activity is measured and relevant statistics on networks operation are obtained by exploiting the wireless nodes' inherent capability (coming from the nature of 802.11 protocol) of receiving/overhearing DATA-ACK messages broadcasted on the radio channel but not destined to themselves. In the presented method wireless link residual bandwidths are calculated according to analytical estimation techniques. As the residual bandwidth is estimated as a result of these calculations, it is possible to have better routing decisions concerning the adequateness of communication bandwidth (for example the link with higher residual bandwidth should be favored in routing decisions) and/or to have availability predictions for the flow admission control process (for example accept a new flow only if there is enough available path residual bandwidth).

The method for estimation of residual bandwidth (1) comprises the steps of:
calculating probability of primary link channel degradation delivery failure, number of competing links and number of successful packet deliveries per unit time on competing links (101),
calculating failure probability on the primary link from idle time method (102),
calculating failure probability on the primary link from collision behavior (103),
comparing the failure probabilities on the primary link already obtained from idle time method and collision behavior (104), using the number of primary link packet deliveries as hypothetical traffic level when the failure probabilities on the primary link deduced from the idle time metod and the collision behavior are equal to each other (105) and calculating residual bandwidth (107)

incrementing the number of packet delivery on the primary link and return to step 102 when the failure probability on the primary link obtained from idle time method and the collision behavior are not equal to each other (106).

In the invention's method of residual bandwidth estimation (1), primary link channel degradation related failure probability is calculated by using the primary link collision probability calculated obtained through measurements by the source node of the primary link and total calculated packet delivery rate. This isbecause the packet delivery failures consist of primary link collision events, hidden node effects and channel degradations. In addition to this, the number of competing links and the number of successful packet deliveries per unit time on the competing links are calculated by using DATA-ACK packets overheard by the transmitter node of the primary link within the update period that is used to carry out the primary link's source node measurements During this measurement process, DATA-ACK pairs are categorized according to their source and destination node addresses. Channel degradation delivery failure rates on the competing links are embedded as extra information into "HELLO" packets used in the level 3 protocols and that are sent periodically to neighboring nodes.

Accordingly, the primary link deduces channel degradation delivery failure rates on the competing links sharing the same contention domain with itself from the content of "HELLO" packets that it's transmitter node receives.

In the 802.11 DCF method, all of the available primary link temporal, resources are used up for either back-off purposes or for packet delivery activity at the primary link or for packet delivery activity at the competing links when saturation condition occurs in that link. To estimate primary link packet delivery failure probability at the hypothetical saturation point, a time sharing model in which the primary link is assumed to operate at the saturation point and the competing links is assumed to be below saturation level is utilized. Within the proposed model, the size of sent packets in the network (in bits), physical rate of the link (in bits/s) and standard parameters of 802.11 exponential back off mechanism are used. As a preferable option, Hidden node based delivery failure probabilities could also be incorporated to the model concerning the estimation on the primary and competing links packet failure rates at the hypothetical saturation point. Moreover, in order to estimate the primary link hypothetical saturation point delivery failure probability by using the packet transmission probabilities at the saturation point of the primary link and hidden node based collision probabilities, a collision dynamics model calculating the transmission probabilities of the competing links by combining the 802.11 standard compliant post back-off behavior of unsaturated competing links with the queuing theory concepts has been deployed. This alternate model also uses the primary link packet failure probability, the number of the competing links and the number of the successful packet delivery on the competing links per unit time, in order to estimate the primary link hypothetical saturation point delivery failure probability, Primary link delivery failure probability is taken into consideration both in the time sharing model and collision dynamics model, because collision probabilities (competing link or hidden node based collisions) increase or decrease depending on the primary link traffic level in a dynamical fashion. The packet delivery failure rates originated from the channel failures are independent of traffic and they do not increase accordingly. In conclusion, at the hypothetical saturation point, the primary link has a certain packet delivery failure probability considering the existing conditions and traffic data, and accordingly it should be observed that estimations for the primary link delivery failure probabilities in both models that adopt independent approaches, converge to same value when the primary link traffic is hypothetically incremented. As the primary link will be at the saturation at the point where the previously mentioned convergence phenomenon occurs, the maximum volume of the successful packet deliveries on the saturated primary link could be successfully predicted as equal to hypothetical primary link traffic level at the convergence point In the method, briefly, successful packet delivery value in the primary link is incremented hypothetically and estimations on collision probability produced by the primary link time sharing model and primary link-competing links collision model is expected to converge to the same value. Accordingly, the maximum allowable number of successful packet transmissions on the primary link is estimated as the hypothetical traffic level at the point where the method is ended. The residual bandwidth on the primary link estimation is made by calculating the difference between the obtained primary link traffic level at the maximum allowable number and the existing real traffic level on the primary link.

The method for estimation of residual bandwidth of the invention can be applied to 802.11 protocol based wireless local area (single hop) and wireless mesh networks (multiple hop networks). In addition, the said method can be used to estimate the traffic on the 802.11 protocol based wireless local area (single hop) and wireless mesh networks (multiple hop networks).

The embodiments according to the method for estimation of residual bandwidth of the invention (1) can be varied; the scope of the invention cannot be restricted with these examples. This invention is principally as disclosed in the claims.

The invention claimed is:

1. A method for estimation of residual bandwidth implemented in a node of a communication network which is connected to a plurality of links, the method comprising the steps of:
   a) calculating probability of primary link channel degradation delivery failure, number of competing links and number of successful packet deliveries per unit time on competing links,
   b) calculating failure probability on the primary link over idle times
   c) calculating failure probability on the primary link over collision behavior (103),
   d) comparing the failure probabilities on the primary link already obtained over idle times and collision behavior,
   e) using the number of primary link packet deliveries as hypothetical traffic level for calculating residual bandwidth in response to the failure probabilities on the primary link over the idle times and the collision behavior being equal to each other,
   f) incrementing the number of packet deliveries on the primary link and repeating steps b) to f) in response to the failure probability on the primary link obtained over idle times and the collision behavior being not equal to each other;
   wherein a time sharing model, in which the primary link is assumed to operate at a saturation point and the competing links is assumed to be below the saturation point, is used to calculate the failure probability on the primary link over the idle times; and wherein a collision dynamics rate, in which transmission probabilities of the competing links are calculated by using an Institute of Electrical and Electronics Engineers (IEEE) 802.11 standard compliant post back-off behavior of unsaturated competing links, is used to calculate the failure probability on the primary link over collision behavior.

2. The method for estimation of residual bandwidth according to claim 1, wherein the residual bandwidth is calculated by a difference between the obtained primary link traffic level at the maximum allowable number and the existing traffic level on the primary link.

3. The method for estimation of residual bandwidth according to claim 1, which is used to estimate the traffic for IEEE 802.11 protocol based wireless local area including single hope networks.

4. The method for estimation of residual bandwidth according to claim 1, which is applied to IEEE 802.11 protocol based wireless local area including single hope networks.

5. The method for estimation of residual bandwidth according to claim 1, which is used to estimate the traffic for IEEE 802.11 protocol based wireless mesh networks including multiple hop networks.

6. The method for estimation of residual bandwidth according to claim 1, which is applied to IEEE 802.11 protocol based wireless mesh networks including multiple hop network.

* * * * *